Aug. 26, 1952 — L. T. KNOCKE — 2,608,334
METHOD OF FORMING AND APPLYING THERMOPLASTIC CLOSURES TO CONTAINERS
Filed Nov. 18, 1947
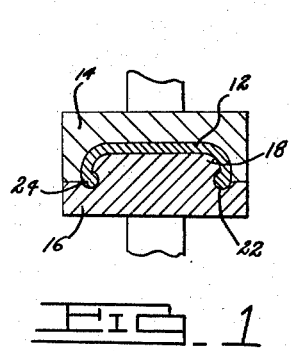
FIG. 1
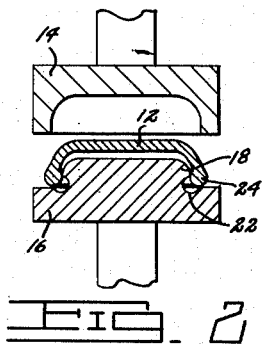
FIG. 2
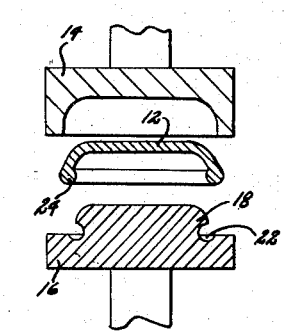
FIG. 3
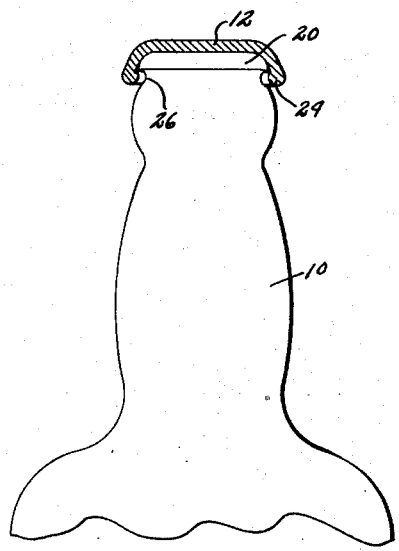
FIG. 4
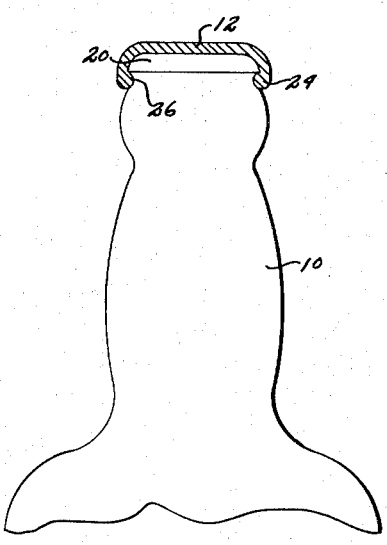
FIG. 5
FIG. 6   FIG. 7
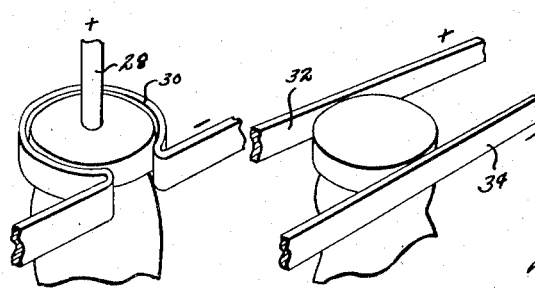
INVENTOR.
LOUIS T. KNOCKE
BY
ATTORNEY Patented Aug. 26, 1952

2,608,334

UNITED STATES PATENT OFFICE 2,608,334

METHOD OF FORMING AND APPLYING THERMOPLASTIC CLOSURES TO CONTAINERS

Louis T. Knocke, Birmingham, Mich.

Application November 18, 1947, Serial No. 786,665

2 Claims. (Cl. 226—84)

This invention relates to a closure member for containers, and more particularly to the method of applying the closure member in sealing position over the opening of the container.

In the application of closure members to containers, particularly caps to the open end of a bottle, it has been common practice to place a flanged cap over the open end of the bottle and by mechanical means deform the flange around a bead at the open end of the bottle for securing the cap in sealing relation to the bottle.

Usually the container is made of glass and in applying the cap through mechanical means considerable loss results due to breakage.

The present invention relates to the application of sealing caps on containers by eliminating mechanical means for deforming the cap, thus eliminating breakage and at the same time increasing the speed of assembly of the cap to the bottle.

An object of the invention is to provide a cap of plastic material which is originally formed into a shape corresponding to or which is slightly smaller than its final shape when the cap is in applied sealed position.

Another object of the invention is to deform or expand the cap after the forming operation and prior to its contact with the container.

A further object of the invention is to apply heat to the deformed cap after it has been placed on the container to cause it to assume its original formed shape for sealing engagement therewith.

A further object of the invention is to apply heat to the cap, preferably by the application of heat through an electrical high frequency field.

A still further object of the invention is to form the cap from a material of thermo-plastic which retains its form and strength up to a predetermined temperature and softens at a temperature above the predetermined temperature.

Other objects and advantages of the invention will more fully appear from the following description taken in connection with the accompanying drawings in which:

Fig. 1 is a sectional view of die members and the preformed cap therein;

Fig. 2 is a view corresponding to Fig. 1 showing the dies separated and the cap partially removed;

Fig. 3 is a view corresponding to Fig. 1 showing the dies separated and the cap removed;

Fig. 4 is a view showing the cap in section as applied to a bottle opening before the sealing operation;

Fig. 5 is a view corresponding to Fig. 4 but showing the cap in sealing position;

Fig. 6 is a fragmentary view showing diagrammatically a form of electrical heating; and Fig. 7 is a view illustrating a modified form of electrical heating.

Referring to an illustrated embodiment of the invention, I have illustrated the neck portion of a bottle 10 as representing a container which receives the cap 12.

The cap 12 is preferably formed from plastic material of the thermo-plastic group including such materials as: cellulose acetate, ethyl cellulose, methyl methacrylate, polystyrene, vinyl chloride acetate (rigid), vinylidene chloride (Saran) and polyamide. The material is to be distinguished from thermo-setting plastics.

The caps 12 are formed to the desired shape by molding in suitable die blocks 14 and 16 as illustrated in Fig. 1, or they may be machined to the desired shape. The die 16 is provided with an annular bead 18 corresponding substantially to the size and shape of the bead 20 around the open end of the bottle neck, except that it is formed slightly smaller. A groove 22 is provided below the bead 18 to form a bead 24 on the inner periphery of the cap 12 which fits the outer peripheral groove 26 in the bottle neck below the bead 18.

The cap 12 is removed from the mold while it is in a semi-plastic state. Since the bead 24 must be forced over the bead 18, the diameter of the bead 24 is increased and the cap is permitted to cool and set in its expanded position. This expansion permits the cap to be placed over the bead 20 on the bottle neck without pressure means.

After the cap has been placed over the bottle neck opening, the cap is heated until it becomes soft and conforms to its original molded shape, conforming to the particular shape of the bottle bead on which it is assembled.

It is preferred to heat the cap by high frequency electric heating commonly known as dielectric heating or dielectric electrostating heating. The dielectric heating produces a molecular friction in the plastic material which causes it to soften and assume its original shape, the bead 24 reducing its diameter to tightly engage the bead 20.

When a dielectric thermo-plastic is subjected to an alternating current of high frequency, from 5 to 50 megacycles per second, the molecules of the thermo-plastic material try to align themselves to the alternating current field, rubbing themselves together with each cycle or reversal of polarity and a pronounced molecular friction is set up. This type of heating is desirable because it heats the cap without unduly heating the container. Infra red rays may be used for heating or other various types of heating may be used to soften the cap so that it returns to its original formed shape while in position for closing an opening. The soft plastic material conforms to the shape of the bottle top and when cooled the cap takes a permanent set in sealing position.

Figs. 6 and 7 illustrate respectively means for dielectrically heating the cap. In Fig. 6 a positive electrode 28 is positioned adjacent the center of a coil 30 formed by a negative electrode. The bottles may be arranged on a conveyor traveling beneath the electrodes and raised into the coil while the caps are on the bottles. In the form illustrated in Fig. 7 spaced parallel electrodes 32 and 34 may be provided with the bottle caps passing therebetween where they are heated in the electrical field.

The method of sealing openings herein disclosed is the equivalent of molding a thermoplastic material over the opening, and upon cooling, the cap will contract and grip the container tightly, thus sealing the bottle against leaking.

While the invention has been described specifically as to one embodiment thereof, it is to be understood that various changes including the size, shape and arrangement of parts may be made and that various methods of heating the caps may be used without departing from the spirit of my invention, and it is not my intention to limit its scope other than by the terms of the appended claims.

I claim:

1. The method of sealing a container which consists in forming a thermo-plastic cap having the property of elastic memory and having an axially and inwardly extending beaded flange, expanding the beaded flange radially after the forming operation and before the plastic material takes a permanent set, applying the cap to the open end of a container, dielectrically heating the cap by high frequency electrical heating to a semi-plastic state to cause it to assume its original formation, and subsequently cooling the cap while on the container.

2. The method of sealing a container which consists in molding a thermo-plastic cap having the property of elastic memory and having an axially extending beaded flange, expanding the beaded flange radially after the molding operation and before the plastic material takes a permanent set, applying the cap to the open end of a container, heating the cap by high frequency electric heating to a semi-plastic state to cause it to assume its original molded formation, and subsequently cooling the cap while on the container.

LOUIS T. KNOCKE.

REFERENCES CITED

The following references are of record in the file of this patent:

UNITED STATES PATENTS

| Number | Name | Date |
|---|---|---|
| 825,115 | Engels | July 3, 1906 |
| 825,116 | Engels | July 3, 1906 |
| 1,430,685 | Sampson | Oct. 3, 1922 |
| 1,863,081 | Bellows | June 14, 1932 |
| 1,905,356 | West | Apr. 25, 1933 |
| 1,998,356 | Brown | Apr. 16, 1935 |
| 2,027,962 | Corkie | Jan. 14, 1936 |
| 2,099,056 | Ferngren | Nov. 16, 1937 |
| 2,169,804 | Kniesche | Aug. 15, 1939 |
| 2,184,281 | Clark | Dec. 26, 1939 |
| 2,252,504 | Hahn | Apr. 12, 1941 |
| 2,325,309 | De Swart | July 27, 1943 |
| 2,431,114 | Golding | Nov. 18, 1947 |
| 2,542,702 | Prow | Feb. 20, 1951 |

FOREIGN PATENTS

| Number | Country | Date |
|---|---|---|
| 526,734 | Great Britain | Sept. 24, 1940 |
| 840,197 | France | Jan. 11, 1939 |